UNITED STATES PATENT OFFICE.

OTIS ALLEN KENYON, OF NEW YORK, N. Y.

AUTOMATIC WELDING-MACHINE.

1,362,491.      Specification of Letters Patent.     Patented Dec. 14, 1920.

Application filed September 13, 1919. Serial No. 323,538.

*To all whom it may concern:*

Be it known that I, OTIS A. KENYON, a citizen of the United States, residing at New York city, in the county of New York and State of New York, have invented certain new and useful Improvements in Automatic Welding-Machines, of which the following is a specification.

My invention relates to certain new and useful improvements in electric arc-welding and particularly automatic welding machines, and the invention comprehends an automatic welding machine embodying mechanism for feeding the welding electrode toward the work and means independent of the feeding mechanism for withdrawing the electrode when it comes into contact with the work, and means for adjusting the distance the electrode is to be drawn from the work, the drawing means being adapted to be automatically stopped during the operation of the feeding mechanism.

With the above and other objects in view, my invention consists of the parts and the construction, arrangements and combinations of parts which I will hereinafter describe and point out in the appended claims.

In the accompanying drawings forming part of this specification and in which similar reference characters indicate like parts in the several views:

Figure 1 illustrates a preferred form of mechanism for feeding the welding electrode.

Fig. 1ª is a part elevation and part sectional view taken at right angles to Fig. 1, showing the magnetic clutch and its operating coil and adjuncts, but omitting the electrode gripping means shown at the upper part of Fig. 1.

In my prior applications, Serial Number 209,343, filed December 28, 1917 and Serial Number 263,190, filed November 19, 1918, I have disclosed automatic devices for continuous non-step feeding of a welding electrode to the work. In such devices the arc is started by a semi-automatic and purely mechanical means. In practice, where a weld must be made from the very first instant, the foregoing method of starting is not always satisfactory. In the present case I have devised improved automatic means of starting, by which the arc is automatically struck and limited, and in case the arc is extinguished, means are provided by which it can be automatically reëstablished.

Figure 1:
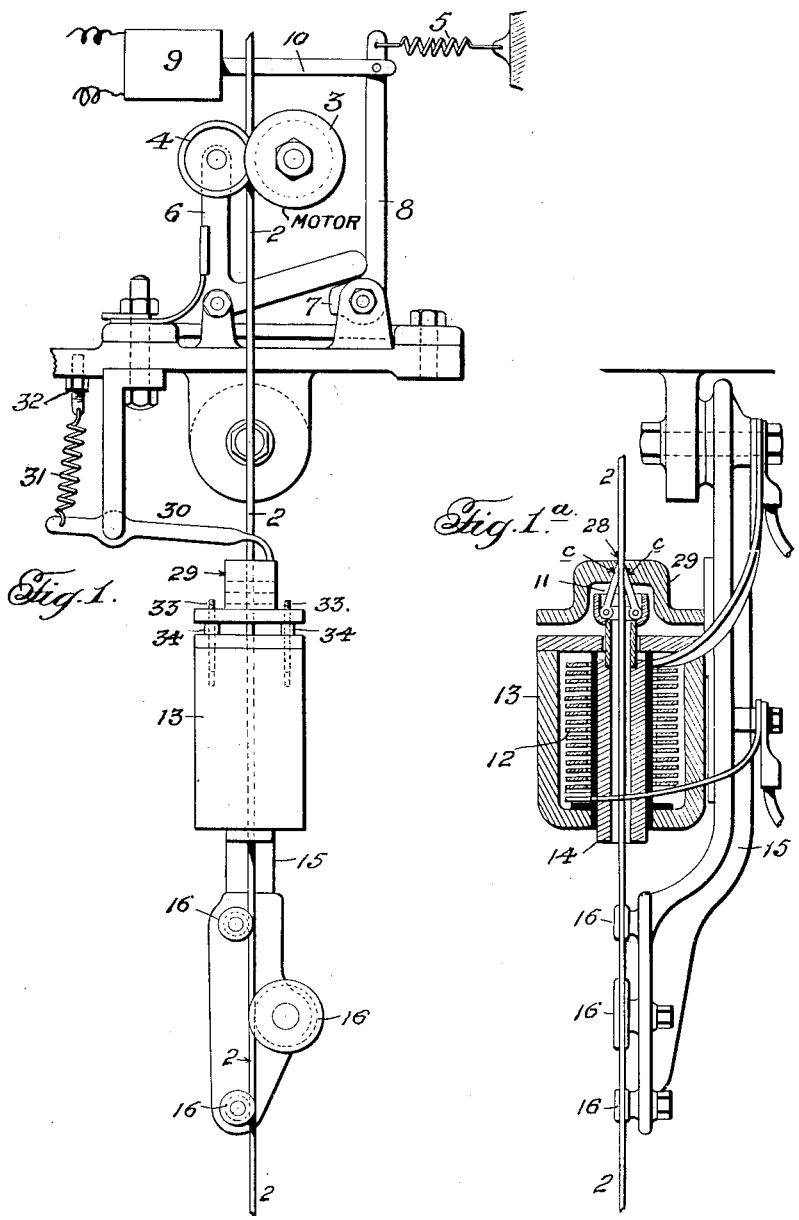

In Figs. 1 and 1ª, I have illustrated a desirable and to some extent preferred type of mechanism for feeding the welding electrode, 2. This electrode is confined between a driving-roller, 3, and a pressure-roller, 4, the electrode being held in contact with the drive-roller by the pressure-roller which in turn is placed under the action of an appropriate pressure spring, 5. The pressure-roller itself is mounted in one arm of the bell-crank lever, 6, the other arm of which is designed to be actuated by a cam, 7, constituting a short-arm of a pivoted lever, 8, the upper end of which is connected to the aforesaid pressure-spring, 5. The lever, 8, is in turn held in gripping position by a solenoid, 9, the core, 10, of which is connected to the lever, as indicated in Fig. 1. Thus, the solenoid acts to hold the lever in the gripping position and the spring 5 holds said lever in the released position.

The welding electrode passes through an appropriate casing, 13, in which is contained a magnetic clutch, 11, of suitable character and which clutch is operated by an appropriate coil, 12, contained within the casing, 13, having a plunger, 14, and appropriately supported on a frame, 15, one part of which has mounted thereon the contact rollers, 16, between which passes the electrode and which rollers convey the current to said electrode, it being understood that the welding arc is struck between the electrode, 2, and the work.

Figure 2:
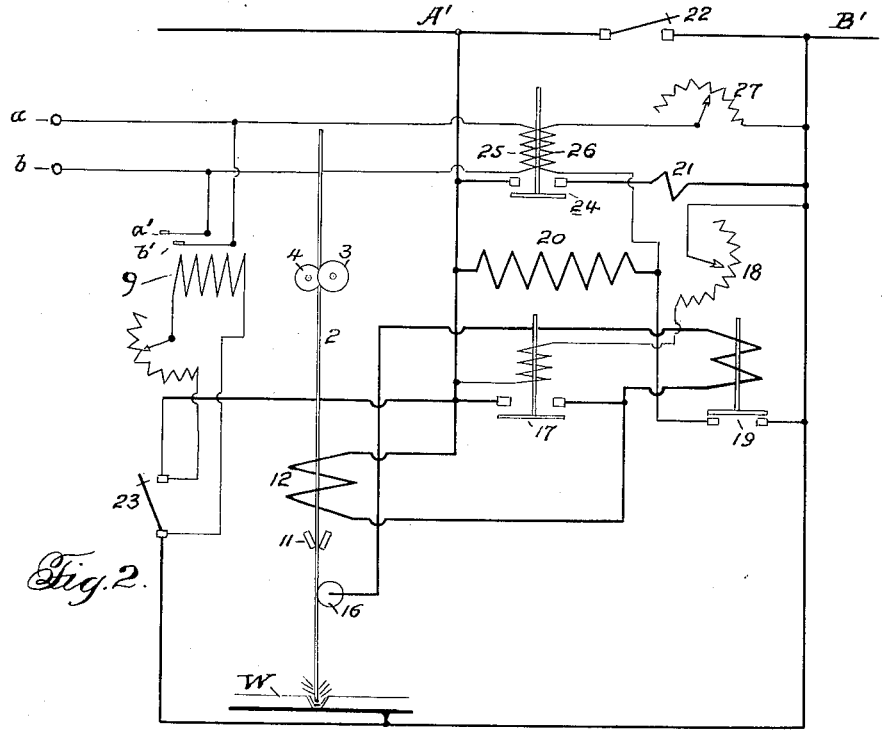
Fig. 2 is a circuit diagram for a method of operating the feeding mechanism as a part of a closed-circuit system.

Fig. 2 illustrates, diagrammatically, the described electrode feed-mechanism in association with a closed circuit system, such as I have disclosed in my prior patents, No. 1,181,227, dated May 2, 1916; Number 1,218,265, dated March 6, 1917; Numbers 1,218,267, dated March 6, 1917; 1,218,269, dated March 6, 1917; and 1,229,288, dated June 12, 1917. In said system (Fig. 2), a contactor, 17, is shown as being so connected as to short-circuit the aforesaid clutch coil, 12, said contactor being actuated by voltage across the welding arc; the closing valve, is adjusted by a suitable rheostat, 18.

Another contactor, 19, is connected in series with a starting-resistor, 20, and is operated by the coil which carries the arc current. In order to adjust the actuating voltage for the coil, 12, I employ a rheostat, 21. In Fig. 2, the source of supply is shown at A', B', which are the terminals of a closed-circuit system similar to the patents before mentioned, a knife-switch 22, in the circuit being designed to short circuit the complete welding station while a second knife switch, 23, is employed to short-circuit the welding head only. In addition to the foregoing, the system of Fig. 2 shows a contactor, 24, as being equipped with two coils, 25 and 26, the former being the holding coil and the latter the arc-coil, the trip out voltage for which latter is adjusted by a rheostat, 27. The holding coil 25, is designed to be excited from a separate source $a$—$b$ and is short circuited by one or more suitable switches $a'$—$b'$, located preferably at the welding station.

Referring again to the feeding devices of Fig. 1, and the use of the same in connection with the system shown in Fig. 2, the operation of the electrode gripping and lifting devices may be generally stated as follows:

The current from the solenoid, 12, acts to lift the plunger, 14, thereby forcing the jaws $c$—$c$ of the magnetic clutch, 11, into a conical shaped hole, 28, which is formed in the cap, 29, that surmounts the casing 13, which casing contains the said coil and plunger, which operation causes the jaws to grip the electrode; a further movement of the plunger serves to lift the electrode and cap together. The pressure with which the grip is applied to the electrode is determined by the resistance offered by a spring mechanism which is herein shown as including a pivoted lever, 30, one arm of which is supported in contact with the cap, 29, while the other and shorter arm is connected to a spring 31, the tension of which may be regulated by an adjusting screw, 32, the construction being such that the instant the coil, 12 is energized, and the plunger, 14, drops, said spring-mechanism returns the various parts to original position.

The length of the arc drawn by the mechanism is adjusted by setting the cap, 29, nearer to or farther away from the end of the magnet, which may be done by adjusting screws or guide pins, 33, thus determining the distance that the jaws travel before they grip the electrode. Where desirable, this adjustment can be made by means of stops arranged for quick operation, but in the present instance, I have shown as an embodiment of this phase of my invention, that the adjustment is determined by the length of suitable sleeves or bushings, 34, placed between the cap and the top of the casing containing the coil, 12, and through which sleeves or bushings pass the aforesaid guide-pins.

By this or a similar construction the adjustment can be changed when desired, by substituting sleeves or bushings of the desired length.

From the foregoing it will be apparent that the operation of the system of Fig. 2 will be substantially as follows:

With the switches, 22, and 23 open, the path of the current is from the terminal, A', through the contactor, 24, and rheostat 21 to the line, B', thus forming part of a closed circuit from a constant-current system. In order to start the arc, the operator closes the switch, $a'$, momentarily which trips the contactor, 24, and inserts the starting resistor, 20, in the line and across the arc, thus starting the driving roller, 3, and causing the pressure roller, 4, to engage the welding pencil by the action of the solenoid, 9. The voltage at which this solenoid causes the pencil to be gripped is adjusted by the rheostat, 18. The electrode then feeds toward the work, shown at W, until the actual contact occurs. The effect of contact is first of all to draw current through the clutch solenoid coil, 12, and starting coil contactor, 19, the first of which causes the electrode to be gripped and an arc drawn while said contactor cuts out the starting resistor. The contact of the welding electrode with the work short-circuits the gripping coil, 12, releasing the driving mechanism and allowing the magnetic clutch, 11, to lift the electrode and draw an arc. The drawing of the arc causes the contactor, 17, to close, short-circuiting the clutch coil, 12, and at the same time causing the solenoid, 9, to act and re-engage the electrode in the driving mechanism. The machine then continues to weld until too long an arc is drawn when the contactor 24, short-circuits the machine by the combined action of the coils, 25 and 26. The voltage at which this shunting action occurs is adjusted by the rheostat, 27. Once the contactor 24 is closed, it is held closed by the current-holding coil, 25 supplied from external source $a$—$b$; and once the arc is stopped in this way, it can only be started by operating the switch, $a'$, as before described.

If it is desired to stop the arc at any time the switch, 23, is closed and when the arc has been stopped as stated, it will immediately start up again automatically when said switch is opened. The whole operation therefore becomes fully automatic when coil, 25, is omitted, or when the switch, $a'$, is kept closed. Of course the switch might also be arranged for closure by a relay that would act immediately after the arc went out.

In order to do satisfactory welding the length of the arc must be maintained as nearly constant as possible. There are two sources of disturbance which are to be guarded against in any full automatic control system:— (1) projections on the work in the line of the weld, (2) sudden melting of the electrode due to imperfection in its structure. The first is the cause of too short an arc and the second is the cause of too long an arc. In the claims the expression "welding lengths" means a length of arc outside of whose limits welding is no longer satisfactory. If the arc is too short the possibility of freezing to the work becomes imminent and if it is too long the welding is unsatisfactory on account of the tendency to burn the metal, due to overheating in the arc and unnecessary exposure to the atmosphere.

The starting mechanism may be used to limit the arc both as to the minimum and maximum length and in this way safeguard the whole operation in case the feeding mechanism does not respond properly to its control. Especially is this important in the matter of the limitation of the minimum length of the arc. As the feeding mechanism described moves the welding electrode always in one direction, it is impossible for it to take care of a sudden shortening of the arc such as occurs when an obstacle is met in the welding line of the joint. If it be assumed that the arc is suddenly shortened by encountering a hight point in the line of the weld, the clutch mechanism can be made to grip the electrode lift it and hold it stationary until the arc has reached a satisfactory length. This is accomplished by adjusting the contactor, 17, by means of a rheostat 18, so that it will drop out at a given minimum voltage and energize the magnetic clutch, 11.

The maximum length of the arc is limited by the contactor, 24, as previously described. The result of too long an arc is to shunt it off and automatically reëstablish the arc by feeding the electrode into contact with the work. This operation becomes purely automatic when the action of the holding coil, 25, is eliminated thereby holding the short circuiting switch, $a'$, closed or by omitting the coil.

Figure 3:
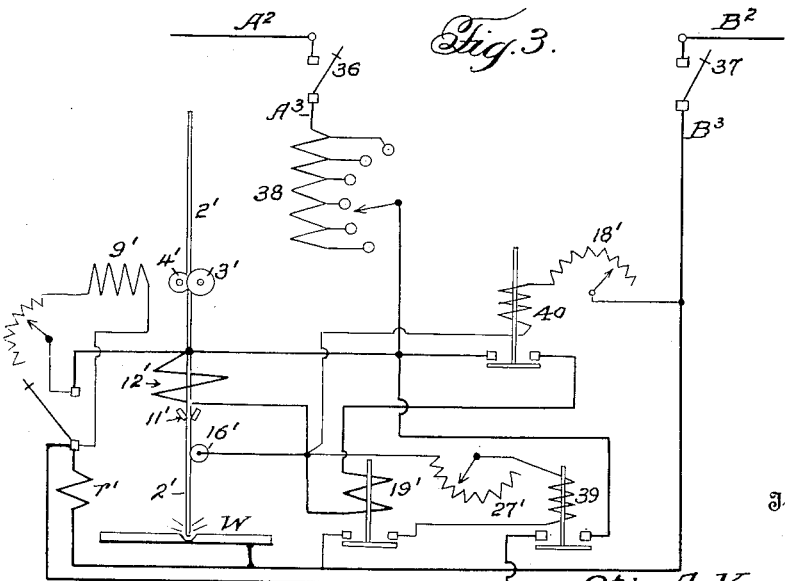
Fig. 3 shows a circuit diagram of my present improvements applied to an ordinary constant-potential circuit.

In Fig. 3 I illustrate a circuit diagram for connecting the electrode feeding devices to a constant potential source of supply, wherein $A^2$ $B^2$ are the terminals of a constant potential circuit and $A^3$ and $B^3$ are the terminals of a welding station, suitable knife switches, 36 and 37, being introduced between the terminals of the welding station and the terminals of the constant-potential circuit. 38 is a ballast resistor, the function of which is to adjust the current.

In the system shown in Fig. 3, 12′ is the clutch solenoid; 11′ the clutch mechanism, and 16′ the contact roll, and 38 is a relay which carries the main welding current as soon as the arc has started, and which relay closes the circuit through the contactor or arc-coil, 39. I also show in Fig. 3, a contactor, 40, the coil of which is connected across the arc in series with the rheostat, 18′, and the function of which contactor is to shunt the clutch-solenoid when the arc has started. The contactor, 39, (Fig. 3), has a coil connected across the arc in series with the contactor, 19′, and rheostat, 27′, and the function of said contactor is to shunt the arc when a definite voltage limit has been exceeded. 9′ is a solenoid which applies pressure to the pressure roll, 4′, of the electrode feeding mechanism and which roll causes the welding electrode, 2′, to be fed into the weld by the co-acting driving roll, 3′, a rheostat being employed to adjust the voltage at which the pressure roll goes into operation, and a shock absorber, $r'$ being employed to limit the current rise when the arc is shunted out of the circuit.

In the arrangement shown in said Fig. 3, the circuit passes through the terminal $A^2$, and $A^3$, through the ballast resistor, 38, clutch solenoid, 12′, contactor roll, 16′, through the arc and thence back to the terminals $B^3$ and $B^2$. The instant the arc is drawn, the contactor, 40 closes, shunting the current away from the solenoid, 12′, and through the contactor, 19′ to the arc. The arc may continue until the operator closes the switch, 37, by hand or until the arc is drawn so long, that contactor, 39, closes thereby shunting the arc and killing it. As long as the arc voltage is above a certain amount, the pressure roller which is operated by solenoid, 9′, feeds the electrode into the weld, and which feeding action will take place at all times when there is a voltage across the arc. If the arc should automatically interrupt itself, the feeding will continue until the electrode comes in contact with the work, when the feeding mechanism will release and the clutch will draw the arc starting the operation all over again. When the arc is stopped by the operation of the contactor, 39, the current is shunted around the contactor 19′, thus causing it to open which in turn deënergizes the contactor, 39, causing it to open, thus leaving the circuit open until the electrode again establishes an arc.

Having thus described my invention what I claim as new and desire to secure by Letters Patent is:—

1. In electric arc welding, the combination of automatically controlled mechanism for feeding the welding electrode toward the work, and means independent of said feeding mechanism for withdrawing the electrode when it comes into contact with the work.

2. In electric arc welding, the combination of automatically controlled mechanism for feeding the welding electrode toward the work, and means independent of said feeding mechanism for withdrawing the electrode a predetermined distance when it comes into contact with the work.

3. In electric arc welding, the combination of automatically controlled mechanism for feeding the welding electrode toward the work, means independent of the said feeding mechanism for withdrawing the electrode when it comes into contact with the work, and means for adjusting the distance the electrode is to be drawn from the work.

4. In electric arc welding, the combination of mechanism for feeding the welding electrode toward the work, and means independent of said feeding mechanism for drawing the arc, said feeding mechanism adapted to be automatically stopped during the operation of the drawing means, and said drawing means adapted to be automatically stopped during the operation of the feeding mechanism.

5. In electric arc welding, the combination of mechanism for feeding the electrode toward the work, and means for limiting the minimum welding length of the arc between said electrode and said work.

6. In electric arc welding, the combination of mechanism for feeding the electrode toward the work, and means controlled by the voltage across the arc for limiting the minimum length of the arc.

7. In electric arc welding, the combination of mechanism for feeding the electrode toward the work, and independent means for limiting the maximum welding length of the arc.

8. In electric arc welding, the combination of mechanism for feeding the electrode toward the work, and means controlled by the voltage across the arc for limiting the maximum length of the arc.

9. In electric arc welding, the combination of mechanism for feeding the electrode toward the work, and means for limiting the maximum and minimum welding lengths of the arc.

10. In electric arc welding, the combination of mechanism for feeding the electrode toward the work, and means controlled by the voltage across the arc for limiting the maximum and minimum lengths of the arc.

In testimony whereof I affix my signature.

OTIS ALLEN KENYON.